United States Patent [19]

Grigsby, Jr. et al.

[11] Patent Number: 4,732,919

[45] Date of Patent: Mar. 22, 1988

[54] REACTION INJECTION MOLDED ELASTOMER MADE FROM A QUASI-PREPOLYMER OF A POLYOXYALKYLENE POLYAMINE AND AN AROMATIC ISOCYANATE

[75] Inventors: Robert A. Grigsby, Jr., Georgetown; Richard J. G. Dominguez, Austin; Wheeler C. Crawford, Houston, all of Tex.

[73] Assignee: Texaco Inc., White Plains, N.Y.

[21] Appl. No.: 927,472

[22] Filed: Nov. 6, 1986

[51] Int. Cl.$^4$ ............................................. C08G 18/14
[52] U.S. Cl. ...................................... 521/159; 521/167; 528/60; 528/61; 528/68; 528/76; 528/77
[58] Field of Search .................. 521/159, 167; 528/60, 528/61, 68, 76, 77

[56] References Cited

U.S. PATENT DOCUMENTS

| 3,862,973 | 1/1975 | Dietrich et al. | 260/453 |
| 4,254,069 | 3/1981 | Dominguez et al. | 264/51 |
| 4,272,618 | 6/1981 | Dominguez et al. | 521/160 |
| 4,297,444 | 10/1981 | Dominguez et al. | 521/160 |
| 4,340,712 | 7/1982 | Reichmann et al. | 528/45 |
| 4,396,729 | 8/1983 | Dominguez et al. | 521/51 |
| 4,433,067 | 2/1984 | Rice et al. | 521/51 |
| 4,444,910 | 4/1984 | Rice et al. | 521/51 |
| 4,530,941 | 7/1985 | Turner et al. | 521/176 |
| 4,595,743 | 6/1986 | Laughner et al. | 528/73 |
| 4,609,683 | 9/1986 | Grigsby et al. | 521/159 |
| 4,609,684 | 9/1986 | Grigsby et al. | 521/163 |
| 4,611,083 | 9/1986 | Buethe et al. | 560/351 |
| 4,686,242 | 8/1987 | Turner et al. | 521/137 |

FOREIGN PATENT DOCUMENTS 81701A 11/1982 European Pat. Off. .

*Primary Examiner*—Maurice J. Welsh
*Attorney, Agent, or Firm*—Jack H. Park; Kenneth R. Priem

[57] ABSTRACT

This invention relates to a reaction injection molded elastomer made by reacting ingredients comprising a high molecular weight polyol or polyoxyalkylene polyamine, a chain extender and a quasi-prepolymer of a polyoxyalkylene polyamine and an aromatic isocyanate.

16 Claims, No Drawings

REACTION INJECTION MOLDED ELASTOMER MADE FROM A QUASI-PREPOLYMER OF A POLYOXYALKYLENE POLYAMINE AND AN AROMATIC ISOCYANATE

BACKGROUND OF THE INVENTION

Field of the Invention

This invention concerns the field of reaction products of polyoxyalkylene polyamine and an aromatic isocyanate.

REFERENCE TO RELATED APPLICATIONS

This application is related to application Ser. No. 927,473 and Ser. No. 924,475 filed of even date.

DESCRIPTION OF RELATED PUBLICATIONS

U.S. Pat. Nos. 4,396,729; 4,444,910 and 4,433,067 concern elastomers prepaed using a high molecular weight amine terminated polyether, an aromatic diamine chain extender and an aromatic polyisocyanate which may merely be a polyisocyanate or a quasi-prepolymer prepared from a polyol reacted with a polyisocyanate wherein some isocyanate groups are still left unreacted. Various patents have been applied for and received using the basic combination recited above as well as various mold release agents and other additives, for example, catalysts.

European paten application Ser. No. 81,701A concerns reaction injection molded elastomers. The corresponding U.S. application Ser. No. 443,444, filed 11/22/82, is the subject of interference proceeding with the '729, '910 and'067 patents referred to above (Interference Nos. 101,393, 101,394; and 101,395).

U.S. Pat. Nos. 4,609,683 and 4,609,684 and application Ser. No. 747,527 filed 6/21/85 disclose or are concerned with quasi-prepolymers of aromatic isocyanates and amine-amides made by the reaction of a polyoxyalkylene polyamine and an isatoic anhydride.

U.S. Pat. No. 4,595,743 discloses RIM elastomers made using amine initiated polyols. The examples disclose the use of quasi-prepolymers.

Our U.S. Pat. Nos. 4,254,069 and 4,272,618 concern the curing of RIM polyurethane elastomers. In the Glossary of these patents, a "polyol" is defined as a di- or greater functionality high molecular weight alcohol or an amine terminated molecule composed of ether groups. In the discussion of chain extenders in these patents, amines, including aromatic diamines, are disclosed. However, the actual examples are of polyether polyurethanes using polyols (hydroxyl terminated) of high molecular weight. The chain extender, monoethanolamine, was used as a crosslinker.

U.S. Pat. No. 4,297,444 discloses RIM elastomers made using a quasi-prepolymer of an aromatic polyisocyanate containing at least 30% of the high molecular weight polyether polyol.

Numerous publications disclose reactions of certain amines and isocyanates for use in elastomers and elsewhere. For example, see U.S. Pat. Nos. 4,340,712 and 3,862,973.

U.S. Pat. No. 4,530,941 discloses RIM elastomers using both polyols and amine-terminated polyols. Quasi-prepolymers like those in U.S. Pat. No. 4,297,444 are recommended.

It is not believed that heretofore it was known to react polyoxyalkylene polyamines in less than stoichiometric amounts with aromatic polyisocyanates and make RIM elastomers from the resulting product.

SUMMARY OF THE INVENTION

The invention is a reaction injection molded elastomer made by reacting in a closed mold a reaction product of a polyoxyalkylene polyamine and an aromatic isocyanate wherein the polyoxyalkylene polyamine is present in less than the stoichiometric amount with an additional amount of a polyoxyalkylene polyamine and an amine terminated crosslinker. The invention also includes a reaction injection molded elastomer wherein all of the polyoxyalkylene polyamine is included in the reaction product of the polyoxyalkylene polyamine and the aromatic isocyanate, which reaction product is then reacted with an amine terminated crosslinker. The invention also includes methods for making the above described reaction injection molded elastomers.

DESCRIPTION OF THE PREFERRED EMBODIMENTS

Polyoxyalkylene polyamines, including primary and secondary amine terminated polyether polyols of greater than 1500 average molecular weight having from 2 to 6 functionality, preferably from 2 to 3, and an amine equivalent weight from about 750 to about 4,000 are useful in this invention. Mixtures of amine terminated polyethers may be used. In a preferred embodiment the amine terminated polyethers have an average molecular weight of at least 2,500. These materials may be made by various methods known in the art.

The amine terminated polyether resins useful in this invention, for example, are polyether resins made from an appropriate initiator to which lower alkylene oxides such as ethylene oxide, propylene oxide, butylene oxide or mixtures thereof are added with the resulting hydroxyl terminated polyol then being aminated. When two or more oxides are used, they may be present as random mixtures or as blocks of one or the other polyether. In the amination step it is highly desirable that the terminal hydroxyl groups in the polyol be essentially all secondary hydroxyl groups for ease of amination. Normally, the amination step does not completely replace all of the hydroxyl groups. However, the majority of hydroxyl groups are replaced by amine groups. Therefore, the amine terminated polyether resins useful in this invention have greater than 50 per cent of their active hydrogens in the form of amine hydrogens. If ethylene oxide is used it is desirable to cap the hydroxyl terminated polyol with a small amount of higher alkylene oxide to ensure that the terminal hydroxyl groups are essentially all secondary hydroxyl groups. The polyols so prepared are then reductively aminated by prior art techniques; for example, as outlined in U.S. Pat. No. 3,654,370, incorporated herein by reference.

In the practice of this invention, a single high molecular weight amine terminated polyether resin may be used. Also, mixtures of high molecular weight amine terminated polyols such as mixtures of di- and trifunctional material and/or different molecular weight or different chemical composition materials may be used.

A wide variety of aromatic polyisocyanates may be used here. Typical aromatic polyisocyanates include p-phenylene diisocyanate, polymethylene polyphenylisocyanate, 2,4-/2,6-toluene diisocyanate, dianisidine diisocyanate, bitolylene diisocyanate, naphthalene-1,4diisocyanate, bis(4-isocyanatophenyl)methane, bis(3-methyl-3-isocyanatophenyl)methane, bis(3-methyl-4- isocyanatophenyl)methane, and 4,4'-diphenylpropane diisocyanate.

Other aromatic polyisocyanates used in the practice of the invention are methylene-bridged polyphenyl polyisocyanate mixtures which have a functionality of from about 2 to about 4. These latter isocyanate compounds are generally produced by the phosgenation of corresponding methylene bridged polyphenyl polyamines, which are conventionally produced by the reaction of formaldehyde and primary aromatic amines, such as aniline, in the presence of hydrochloric acid and/or other acidic catalysts. Known processes for preparing polyamines and corresponding methylene-bridged polyphenyl polyisocyanates therefrom are described in the literature and in many patents; for example, U.S. Pat. Nos. 2,683,730; 2,950,263; 3,012,008; 3,344,162 and 3,362,979.

Usually methylene-bridged polyphenyl polyisocyanate mixtures contain about 20 to about 100 weight percent methylene diphenyldiisocyanate isomers, with the remainder being polymethylene polyphenyl diisocyanates having higher functionalities and higher molecular weights. Typical of these are polyphenyl polyisocyanate mixtures containing about 20 to 100 weight percent methylene diphenyldiisocyanate isomers, of which 20 to about 95 weight percent thereof is the 4,4'-isomer with the remainder being polymethylene polyphenyl polyisocyanates of higher molecular weight and functionality that have an average functionality of from about 2.1 to about 3.5. These isocyanate mixtures are known, commercially available materials and can be prepared by the process described in U.S. Pat. No., 3,362,979, issued January 9, 1968 to Floyd E. Bentley.

By far the most preferred aromatic polyisocyanate is methylene bis(4-phenylisocyanate) or MDI. Pure MDI, quasi-prepolymers of MDI, modified pure MDI, etc. are useful. Materials of this type may be used to prepare suitable RIM elastomers. Since pure MDI is a solid and, thus, often inconvenient to use, liquid products based on MDI are often used and are included in the scope of the terms MDI or methylene bis(4-phenylisocyanate) used herein. U.S. Pat. No. 3,394,164 is an example of a liquid MDI product. More generally, uretonimine modified pure MDI is included also. This product is made by heating pure distilled MDI in the presence of a catalyst. The liquid product is a mixture of pure MDI and modified MDI:

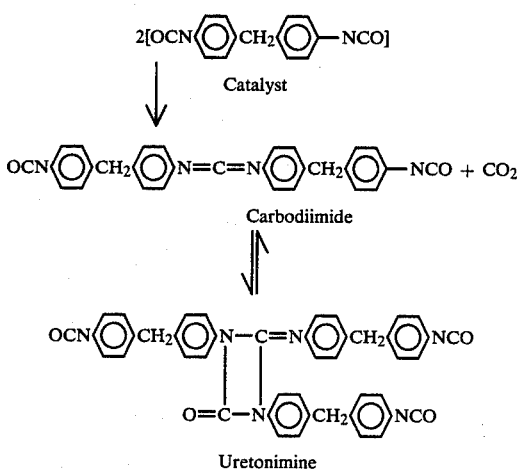

Examples of commercial materials of this type are Upjohn's ISONATE ® 125M (pure MDI) and ISONATE 143L ("liquid" MDI). Preferably the amount of isocyanates used is the stoichiometric amount based on all the ingredients in the formulation or greater than the stoichiometric amount.

One embodiment of this invention is a method for making reaction products of aromatic isocyanates and polyoxyalkylene polyamines which may be made rapidly without the use of a catalyst. Another embodiment of this invention is also the reaction product of the aromatic isocyanate and polyoxyalkylene polyamine. Catalysts and/or a long reaction time are generally required in manufacturing reaction products of polyols and isocyanates.

Polyoxyalkylene polyamines are very reactive with isocyanates and unlike the reaction between polyols and isocyanates, no heat or catalyst is required to carry out the reaction between polyoxyalkylene polyamines and isocyanates. The examples use some heat but it is not required. Since the reaction between polyoxyalkylene polyamines and isocyanate takes place quickly and without the addition of a catalyst, it is necessary to provide methods of mixing which will encourage the uniform mixing at a rate as fast as or faster than the reaction is taking place to promote uniform mixing and uniform reactions throughout the mixture. If a vessel is used to provide mixing with a moving or static mechanical stirrer, then the stirring must be at such a rate to provide this uniform and speedy mixing so that the reaction will be homogeneous throughout the mixture. The stirring may also be done by other means known to those skilled in the art such as mixing in solvents or impingement mixing. In impingement mixing two or more streams are impacted at a high velocity and the resulting turbulence provides intimate mixing very rapidly. Impingement mixing is known to those skilled in the art and, as is known to those in the reaction injection molding area, the head of a RIM machine relies on impingement mixing to mix reactants together. In one embodiment of this invention, a reaction product of a polyoxyalkylene polyamine and an isocyanate could be made by mixing them through the head of a RIM machine or similar device and instead of injecting this material into a mold which is done in the normal RIM process, the mixture would be directed to a container for later use. Depending on the type of polyoxyalkylene polyamine and the type of isocyanate, the degree of speed of mixing necessary to provide the uniform homogeneous reaction would vary. For example, in the case of a typical aliphatic isocyanate reacted with a polyoxyalkylene polyamine, the reaction rate, although fast, might be slow enough to allow mechanical mixing means such as stirrers to be used if desired. However, in a case where a polyoxyalkylene polyamine is mixed with a aromatic isocyanate the reaction takes place at a very rapid rate. Normal mixing means such as stirrers may not be practical since they cannot mix the two components rapidly enough to avoid non-homogeneous reaction phases in the final product. In this case, then the impingement mixing technique or a mixing technique known to those skilled in the art, which is at least as rapid and thorough as impingement mixing, might need to be used in order that the final product be mixed rapidly and in such a homogeneous manner that the final reacted product is uniform throughout.

When an amount of active hydrogen containing material, whether it be polyol or polyoxyalkylene polyamine, is used which is less than the stoichiometric amount needed to react with the isocyanate present, the product is generally called a quasi-prepolymer. When the reaction product consists of stoichiometrically equal amounts of active hydrogen material and isocyanate, the product is generally called a prepolymer. These materials are useful for the manufacture of plastics called polyurethanes if the final plastic contains only hydroxyl-isocyanate linkages, polyurea/polyurethane if they contain both hydroxyl-isocyanate linkages and amine-isocyanate linkages or polyurea products if they contain only amine-isocyanate linkages.

When used to manufacture the above-mentioned polyurethane and/or polyurea plastics, it is necessary to further react the quasi-prepolymers with additional active hydrogen containing material, including but not limited to polyoxyalkylene polyamines, polyols and chain extenders. The products that may be made are well known in the art and include products ranging from flexible foams to cast and RIM elastomers or rigid foams, and other variations. These products and their manufacture are well known to those skilled in the art.

Additional ingredients which may be used if desired for specific applications include blowing agents, catalysts, fillers, coloring agents and surfactant materials. Those skilled in the art will recognize that some or all ingredients may not be necessary, especially in the case of catalysts. If the quasi-prepolymer of the invention is further reacted with a polyoxyalkylene polyamine, a catalyst may not be necessary. However, if the prepolymer is to be further reacted with a hydroxyl containing material such as a polyol, a catalyst may be desirable. The following description of optional materials is set out to instruct those attempting to use the quasi-prepolymers of this invention in the ingredients they may find useful as workers skilled in the art.

It may be desirable to incorporate chain extenders into the reaction between the quasi-prepolymer of this invention and either polyols or polyoxyalkylene polyamines of high molecular weight. Hydroxyl containing chain extenders such as ethylene glycol, 1,4-butane diol and the like may be used.

The aromatic diamine chain extenders useful include, for example, 1-methyl-3,5-diethyl-2,4-diaminobenzene, 1-methyl-3,5-diethyl-2,6-diaminobenzene (both of these materials are also called diethyltoluene diamine or DETDA), 1,3,5-triethyl-2,6-diaminobenzene, 3,5,3',5'-tetraethyl-4,4'-diaminodiphenylmethane and the like. Particularly preferred aromatic diamine chain extenders are 1-methyl-3,5-diethyl-2,4-diaminobenzene or a mixture of this compound with 1-methyl-3,5-diethyl-2,6-diaminobenzene. Other chain extenders include aliphatic materials, for example, as described in U.S. Pat. Nos. 4,246,363 and 4,269,945.

Other chain extenders which find us in the method of this invention are low molecular weight polyoxyalkylene polyamines which contain terminal amine groups and are represented by the formula

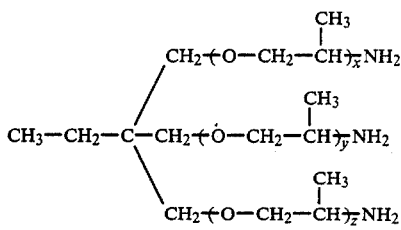

wherein $x+y+z$ has a value of about 5.3. The product is commercially available from Texaco Chemical Company as JEFFAMINE® T-403. Another related polyoxypropylene polyamine is represented by the formula

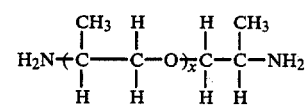

wherein x has a value of about 5.6. This product has an average amine hydrogen equivalent weight of about 100 and is commercially available from Texaco Chemical Company as JEFFAMINE® D-400. The product having the same formula as above wherein x has an average value of about 2.6 is also useful. This product is commercially available from Texaco Chemical Company as JEFFAMINE D-230.

Other chain extenders will be apparent to those skilled in the art.

It is especially preferred to react materials with the polyoxyalkylene-aromatic isocyanate prepolymer which give a urea linkage. That is, react polyoxyalkylene polyamines and amine terminated chain extenders.

If needed, the following catalysts may be useful when reacting the composition of this invention with isocyanate. Catalysts such as tertiary amines or an organic tin compound or other polyurethane catalysts may optionally be used. The organic tin compound may suitably be a stannous or stannic compound such as a stannous salt of a carboxylic acid, a trialkyltin oxide, a dialkyltin dihalide, a dialkyltin oxide, etc., wherein the organic groups of the organic portion of the tin compound are hydrocarbon groups containing from 1 to 8 carbon atoms. For example, dibutyltin dilaurate, dibutyltin diacetate, diethyltin diacetate, dihexyltin diacetate, di-2-ethylhexyltin oxide, dioctyltin dioxide, stannous octoate, stannous oleate, etc., or a mixture thereof, may be used.

Tertiary amine catalysts include trialkylamines (e.g., trimethylamine, triethylamine); heterocyclic amines, such as N-alkymorpholines (e.g., N-methylmorpholine, N-ethylmorpholine, dimethyldiaminodiethylether, etc.), 1,4-dimethylpiperazine, triethylenediamine, etc.; and aliphatic polyamines such as N,N,N'N'-tetramethyl-1,3-butanediamine.

Other conventional formulation ingredients may be employed as needed such as; for example, foam stabilizers, also known as silicone oils or emulsifiers. The foam stabilizers may be an organic silane or siloxane. For example, compounds may be used having the formula:

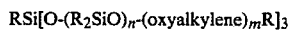

wherein R is an alkyl group containing from 1 to 4 carbon atoms; n is an integer of from 4 to 8; m is an integer of from 20 to 40; and the oxyalkylene groups are derived from propylene oxide and ethylene oxide. See, for example, U.S. Pat. No. 3,194,773.

The following examples were processed on an Accuratio VR-100 two-component RIM machine. The materials were injected into a flat plaque mold measuring 18"×18"×0.125". Molding conditions are outlined in the examples. The quasi-prepolymers used in the examples are described below:

Quasi-prepolymer A—prepared by reacting JEFFAMINE ® D-4000 50 wt. %) with ISONATE ® 143L (50 wt. %).

Quasi-prepolymer B—prepared by reacting a 4000 molecular weight polypropylene glycol (50 wt. %) with ISONATE 143L (50 wt. %).

Quasi-prepolymer C—prepared by reacting JEFFAMINE T-5000 (33.3 wt. %) with ISONATE 143L (66.6 wt. %).

Example 1 shows the improvement of the invention. Example 2 is known art while Example 1 illustrates the improvement over prior art. Example 1 uses a 4,000 molecular weight amine terminated polyoxypolyether polyol while Example 2 uses a 4,000 molecular weight polyoxypolyether polyol.

EXAMPLE 1

JEFFAMINE ® T-5000 (42.2 pbw) and diethyltoluenediamine (DETDA) 17.7 pbw) were charged into the B-component working tank of the Accuratio RIM machine. Quasi-prepolymer A (70.9 pbw) was charged into the A-component tank. The temperatures of the two streams were adjusted to 125° F. and 135° F., respectively. The components were injected into the flat plaque mold which had been preheated to 160° F. The part was removed from the mold in 30 seconds. The resulting elastomer was post cured at 250° F. for one hour. Physical properties of the elastomer are shown in Table 1.

EXAMPLE 2

(Comparison)

JEFFAMINE ® T-5000 (42.2 pbw) and DETDA (17.7 pbw) were charged into the B-component working tank of the Accuratio RIM machine. Quasi-prepolymer B (71.4 pbw) was charged into the A-component tank. The temperatures of the two streams were adjusted to 125° F. and 137° F., respectively. The components were injected into the flat plaque mold which had been preheated to 160° F. The part was removed from the mold in 30 seconds. The resulting elastomer was post cured at 250° F. for one hour. Physical properties of the elastomer are shown in Table 1.

TABLE 1

|  | Example 1 | Example 2 |
| --- | --- | --- |
| Shore D, instant/10 seconds | 45/39 | 45/40 |
| Tensile strength, psi | 3340 | 2870 |
| Ultimate elongation, % | 340 | 320 |
| Tear, pli | 460 | 430 |
| Flexural modulus, psi |  |  |
| −20° F. | 57200 | 65900 |
| 77° F. | 31800 | 28500 |
| 158° F. | 23700 | 21300 |
| Heat sag |  |  |
| 250° F., 150 mm | 19.5 | 54.9 |
| 250° F., 100 mm | 4.7 | 3.3 |
| −20° F./158° F. modulus ratio | 2.41 | 3.09 |

EXAMPLE 3

Diethyltoluenediamine (DETDA) was charged into the B-component working tank of the Accuratio RIM machine. Quasi-prepolymer A was charged into the A-component tank. The temperature of the two streams were adjusted to 107° F. and 136° F., respectively. The components were injected (28.9 pbw B-component, 105.0 pbw A-component) into the flat plaque mold in 30 seconds. The resulting elastomer was post cured at 311° F. for 30 minutes. Physical properties of the elastomer are listed in Table 2.

EXAMPLE 4

JEFFAMINE ® T-5000 (62.33 pbw), tert-butyltoluenediamine (19.0 pbw) and zinc stearate (1.39 pbw) were charged into the B-component working tank of the Accuratio RIM machine. Quasi-prepolymer C (57.2 pbw) was charged into the A-component tank. The temperature of the B-component tank was raised to 200° F. and held for one hour. The B-component tank was then cooled to 127° F. The temperature of the A-component was adjusted to 134° F. The components were injected into the flat plaque mold which had been preheated to 160° F. The part was removed from the mold in 30 seconds. The resulting elastomer was post cured at 250° F for one hour. Physical properties of the elastomer are listed in Table 2.

EXAMPLE 5

JEFFAMINE ® T-5000 (62.33 pbw) and DETDA (19.0 pbw) were charged into the B-component working tank of the Accuratio RIM machine. Quasi-prepolymer C (57.7 pbw) was charged into the A-component tank. The temperature of the A-component tank was raised to 121° F. and the B-component tank was raised to 120° F. The components were injected into the flat plaque mold which had been preheated to 160° F. The part was removed from the mold in 30 seconds. The resulting elastomer was post cured at 250° F. for one hour. Physical properties of the elastomer are listed in Table 2.

TABLE 2

|  | Example 3 | Example 4 | Example 5 |
| --- | --- | --- | --- |
| Shore D, instant/10 seconds | 58/56 | 46/41 | 45/40 |
| Tensile strength, psi | 3730 | 2970 | 3340 |
| Ultimate elongation, % | 54 | 300 | 280 |
| Tear, pli | — | 445 | 410 |
| Flexural modulus, psi |  |  |  |
| −20° F. | 147,000 | 93,000 | 68,000 |
| 77° F. | 108,000 | 37,000 | 31,000 |
| 158° F. | 84,000 | 27,000 | 25,000 |
| 311° F. | 79,000 | — | — |
| Heat sag |  |  |  |
| 250° F., 150 mm | — | 17.1 | 11.7 |
| 311° F., 150 mm | 4.0 | — | — |
| 400° F., 150 mm | 24.9 | — | — |
| −20° F./158° F. modulus ratio | 1.75 | 3.4 | 2.72 |

| GLOSSARY | |
| --- | --- |
| JEFFAMINE ® T-5000 | Polypropylene oxide triamine of about 5,000 molecular weight; a product of Texaco Chemical Co., Inc. |
| JEFFAMINE D-4000 | Polypropylene oxide diamine of about 4,000 molecular weight; a product of Texaco Chemical Co., Inc. |
| ISONATE ® 143L | Carbodiimide modified liquid MDI; |

| | GLOSSARY |
|---|---|
| | a product of Dow Chemical Co. |
| DETDA | Diethyltoluenediamine; a product of Ethyl Corp. |
| RIM | Reaction Injection Molded (used interchangeably). |

We claim:

1. A reaction injection molded elastomer made by reacting in a closed mold a reaction product of a polyoxyalkylene polyamine and an aromatic isocyanate wherein the polyoxyalkylene polyamine is present in less than the stoichiometric amount with an additional amount of a polyoxyalkylene polyamine and an amine terminated crosslinker.

2. A reaction injection molded elastomer made by reacting in a closed mold a reaction product of a polyoxyalkylene polyamine and an aromatic isocyanate wherein the polyoxyalkylene polyamine is present in less than the stoichiometric amount and wherein the polyoxyalkylene polyamine has a greater than 1500 average molecular weight and a functionality ranging from 2 to 6, and has greater than 50% of its active hydrogens in the form of amine hydrogens, with an additional amount of a polyoxyalkylene polyamine as defined above and an amine terminated crosslinker.

3. A reaction injection molded elastomer made by reacting in a closed mold a reaction product of a polyoxyalkylene polyamine and an aromatic isocyanate wherein the polyoxyalkylene polyamine is present in less than the stoichiometric amount and wherein the polyoxyalkylene polyamine has a greater than 2500 average molecular weight and a functionality ranging from 2 to 6, and has greater than 50% of its active hydrogens in the form of amine hydrogens, with an additional amount of a polyoxyalkylene polyamine as defined above and an amine terminated crosslinker.

4. A reaction injection molded elastomer made by reacting in a closed mold a reaction product of a polyoxyalkylene polyamine and an aromatic isocyanate wherein the polyoxyalkylene polyamine is present in less than the stoichiometric amount and wherein the polyoxyalkylene polyamine has a greater than 2500 average molecular weight and a functionality ranging from 2 to 3, and has greater than 50% of its active hydrogens in the form of amine hydrogens, with an additional amount of a polyoxyalkylene polyamine as defined above and an amine terminated crosslinker.

5. A reaction injection molded elastomer made by reacting in a closed mold a reaction product of a polyoxyalkylene polyamine and an aromatic isocyanate wherein the polyoxyalkylene polyamine is present in less than the stoichiometric amount and is the entire amount of polyoxyalkylene polyamine in the RIM elastomer with an amine terminated crosslinker.

6. A reaction injection molded elastomer made by reacting in a closed mold a reaction product of a polyoxyalkylene polyamine and an aromatic isocyanate wherein the polyoxyalkylene polyamine is present in less than the stoichiometric amount and is the entire amount of polyoxyalkylene polyamine in the RIM elastomer wherein the polyoxyalkylene polyamine has a greater than 1,500 average molecular weight and a functionality ranging from 2 to 6, and has greater than 50% of its active hydrogens in the form of amine hydrogens with an amine terminated cross-linker.

7. A reaction injection molded elastomer made by reacting in a closed mold a reaction product of a polyoxyalkylene polyamine and an aromatic isocyanate wherein the polyoxyalkylene polyamine is present in less than the stoichiometric amount and is the entire amount of polyoxyalkylene polyamine in the RIM elastomer wherein the polyoxyalkylene polyamine has a greater than 2,500 average molecular weight and a functionality ranging from 2 to 6, and has greater than 50% of its active hydrogens in the form of amine hydrogens with an amine terminated crosslinker.

8. A reaction injection molded elastomer made by reacting in a closed mold a reaction product of a polyoxyalkylene polyamine and an aromatic isocyanate wherein the polyoxyalkylene polyamine is present is less than the stoichiometric amount and is the entire amount of polyoxyalkylene polyamine in the RIM elastomer and wherein the polyoxyalkylene polyamine has a greater than 2,500 average molecular weight and a functionality ranging from 2 to 3, and has greater than 50% of its active hydrogens in the form of amine hydrogens with an amine terminated crosslinker.

9. A method for making a reaction injection molded elastomer comprising reacting in a closed mold a reaction product of a polyoxyalkylene polyamine and an aromatic isocyanate wherein the polyoxyalkylene polyamine is present in less than the stoichiometric amount with an additional amount of a polyoxyalkylene polyamine and an amine terminated crosslinker.

10. A method for making a reaction injection molded elastomer comprising reacting in a closed mold a reaction product of a polyoxyalkylene polyamine and an aromatic isocyanate wherein the polyoxyalkylene polyamine is present in less than the stoichiometric amount and wherein the polyoxyalkylene polyamine has a greater than 1500 average molecular weight and a functionality ranging from 2 to 6, and has greater than 50% of its active hydrogens in the form of amine hydrogens, with an additional amount of a polyoxyalkylene polyamine as defined above and an amine terminated crosslinker.

11. A method for making a reaction injection molded elastomer comprising reacting in a closed mold a reaction product of a polyoxyalkylene polyamine and an aromatic isocyanate wherein the polyoxyalkylene polyamine is present in less than the stoichiometric amount and wherein the polyoxyalkylene polyamine has a greater than 2500 average molecular weight and a functionality ranging from 2 to 6, and has greater than 50% of its active hydrogens in the form of amine hydrogens, with an additional amount of a polyoxyalkylene polyamine as defined above and an amine terminated crosslinker.

12. A method for making a reaction injection molded elastomer comprising reacting in a closed mold a reaction product of a polyoxyalkylene polyamine and an aromatic isocyanate wherein the polyoxyalkylene polyamine is present in less than the stoichiometric amount and wherein the polyoxyalkylene polyamine has a greater than 2500 average molecular weight and a functionality ranging from 2 to 3, and has greater than 50% of its active hydrogens in the form of amine hydrogens, with an additional amount of a polyoxyalkylene polyamine as defined above and an amine terminated crosslinker.

13. A method for making a reaction injection molded elastomer comprising reacting in a closed mold a reaction product of a polyoxyalkylene polyamine and an aromatic isocyanate wherein the polyoxyalkylene polyamine is present in less than the stoichiometric amount and is the entire amount of polyoxyalkylene polyamine in the RIM elastomer with an amine terminated crosslinker.

14. A method for making a reaction injection molded elastomer comprising reacting in a closed mold a reaction product of a polyoxyalkylene polyamine and an aromatic isocyanate wherein the polyoxyalkylene polyamine is present in less than the stoichiometric amount and is the entire amount of polyoxyalkylene polyamine in the RIM elastomer wherein the polyoxyalkylene polyamine has a greater than 1,500 average molecular weight and a functionality ranging from 2 to 6, and has greater than 50% of its active hydrogens in the form of amine hydrogens with an amine terminated crosslinker.

15. A method for making a reaction injection molded elastomer comprising reacting in a closed mold a reaction product of a polyoxyalkylene polyamine and an aromatic isocyanate wherein the polyoxyalkylene polyamine is present in less than the stoichiometric amount and is the entire amount of polyoxyalkylene polyamine in the RIM elastomer wherein the polyoxyalkylene polyamine has a greater than 2,500 average molecular weight and a functionality ranging from 2 to 6, and has greater than 50% of its active hydrogens in the form of amine hydrogens with an amine terminated crosslinker.

16. A method for making a reaction injection molded elastomer comprising reacting in a closed mold a reaction product of a polyoxyalkylene polyamine and an aromatic isocyanate wherein the polyoxyalkylene polyamine is present in less than the stoichiometric amount and is the entire amount of polyoxyalkylene polyamine in the RIM elastomer and wherein the polyoxyalkylene polyamine has a greater than 2,500 average molecular weight and a functionality ranging from 2 to 3, and has greater than 50% of its active hydrogens in the form of amine hydrogens with an amine terminated crosslinker.

* * * * *